United States Patent
Iwamura et al.

(10) Patent No.: US 9,497,438 B2
(45) Date of Patent: Nov. 15, 2016

(54) IMAGE DATA TRANSMISSION APPARATUS, IMAGE DATA TRANSMISSION METHOD, AND IMAGE DATA RECEIVING APPARATUS

(75) Inventors: Atsushi Iwamura, Tokyo (JP); Hajime Inoue, Chiba (JP)

(73) Assignee: Sony Corporation (JP)

( * ) Notice: Subject to any disclaimer, the term of this patent is extended or adjusted under 35 U.S.C. 154(b) by 371 days.

(21) Appl. No.: 13/320,967

(22) PCT Filed: Mar. 22, 2011

(86) PCT No.: PCT/JP2011/056861
§ 371 (c)(1),
(2), (4) Date: Nov. 17, 2011

(87) PCT Pub. No.: WO2011/118592
PCT Pub. Date: Sep. 29, 2011

(65) Prior Publication Data
US 2012/0069158 A1 Mar. 22, 2012

(30) Foreign Application Priority Data
Mar. 25, 2010 (JP) ............................... P2010-070571

(51) Int. Cl.
*H04N 13/00* (2006.01)
*H04N 13/04* (2006.01)
(Continued)

(52) U.S. Cl.
CPC .......... *H04N 13/0029* (2013.01); *H04N 13/04* (2013.01); *H04N 21/43635* (2013.01);
(Continued)

(58) Field of Classification Search
None
See application file for complete search history.

(56) References Cited

U.S. PATENT DOCUMENTS

2002/0030675 A1* 3/2002 Kawai ........................... 345/204
2004/0080671 A1* 4/2004 Siemens et al. ............. 348/473
(Continued)

FOREIGN PATENT DOCUMENTS

EP 1804503 A1 7/2007
JP 2009-296144 A 12/2009
(Continued)

OTHER PUBLICATIONS

High-Definition Multimedia Interface Specification Version 1.4, Jun. 5, 2009; pp. i-197; Supplement 1—Consumer Electronics Control (CEC), pp. CEC i-CEC 127; Supplement 2—HDMI Ethernet and Audio Return Channel (HEAC), pp. HEAC i-HEAC 72.
(Continued)

*Primary Examiner* — Geepy Pe
(74) *Attorney, Agent, or Firm* — Lerner, David, Littenberg, Krumholz & Mentlik, LLP

(57) ABSTRACT

[Object] To prevent image quality deterioration due to unnecessary format conversion.
[Solution] An STB (set top box) 200 receives bit stream data that is transmitted from a broadcast station 100 in such a manner as to be carried on a broadcast wave, and obtains stereoscopic image data, audio data, and the like. Furthermore, the STB 200 transmits the stereoscopic image data and the audio data to the TV (television receiver) 300 through the digital interface of HDMI. In a case where the received stereoscopic image data can be handled by a TV 300 and, furthermore, the TV 300 has requested that transmission of the stereoscopic image data be performed without performing format conversion, the STB 200 does not convert the format of the received image data, and transmits the received image data to the TV 300 in the as-is format. Furthermore, in the case of other cases, the STB 200 converts in advance the format of the received stereoscopic
(Continued)

image data into, for example, a format that is set by the user, and transmits the stereoscopic image data to the TV 300.

9 Claims, 12 Drawing Sheets

(51) Int. Cl.
*H04N 21/4402* (2011.01)
*H04N 21/4363* (2011.01)
*H04N 21/81* (2011.01)

(52) U.S. Cl.
CPC ........ *H04N 21/4402* (2013.01); *H04N 21/816* (2013.01); *H04N 13/0059* (2013.01); *H04N 13/0066* (2013.01)

(56) References Cited

U.S. PATENT DOCUMENTS

| | | | |
|---|---|---|---|
| 2007/0186015 A1* | 8/2007 | Taft et al. | 710/16 |
| 2007/0296859 A1* | 12/2007 | Suzuki | 348/473 |
| 2009/0031365 A1* | 1/2009 | Kwon et al. | 725/81 |
| 2010/0045782 A1 | 2/2010 | Morita | |
| 2010/0085424 A1* | 4/2010 | Kane et al. | 348/53 |
| 2010/0086285 A1* | 4/2010 | Sasaki et al. | 386/108 |
| 2010/0128626 A1* | 5/2010 | Anderson et al. | 370/252 |
| 2010/0289872 A1* | 11/2010 | Funabiki et al. | 348/43 |
| 2011/0141236 A1 | 6/2011 | Mitani et al. | |
| 2011/0157310 A1 | 6/2011 | Mitani et al. | |

FOREIGN PATENT DOCUMENTS

| | | |
|---|---|---|
| JP | 2010-034704 A | 2/2010 |
| JP | 2010-049607 A | 3/2010 |
| JP | 2010-088092 A | 4/2010 |
| WO | 2010026737 A1 | 3/2010 |

OTHER PUBLICATIONS

Office Action from Chinese Application No. 201180002607.8, dated Dec. 2, 2013.
Office Action from Japanese Application No. 2010-070571, dated Oct. 8, 2013.
Communication from EP Application No. 11759397, dated Nov. 20, 2013.
Extended European Search Report for Application No. 16160938.3 dated Jul. 27, 2016.

\* cited by examiner

FIG. 8

| Byte# | 7 | 6 | 5 | 4 | 3 | 2 | 1 | 0 |
|---|---|---|---|---|---|---|---|---|
| | | | | | bits | | | |
| 1 | Native | Video Identification Code | | | | | | |

FIG. 9

| Video ID Code | Formats | Field Rate | Picture Aspect Ratio (H:V)[1] | Pixel Aspect Ratio (H:V) |
|---|---|---|---|---|
| 1 | 640×480p | 59.94Hz/60Hz | 4:3 | 1:1 |
| 2 | 720×480p | 59.94Hz/60Hz | 4:3 | 8:9 |
| 3 | 720×480p | 59.94Hz/60Hz | 16:9 | 32:27 |
| 4 | 1280×720p | 59.94Hz/60Hz | 16:9 | 1:1 |
| 5 | 1920×1080i | 59.94Hz/60Hz | 16:9 | 1:1 |
| 6 | 720(1440)×480i | 59.94Hz/60Hz | 4:3 | 8:9 |
| 7 | 720(1440)×480i | 59.94Hz/60Hz | 16:9 | 32:27 |
| 8 | 720(1440)×240p | 59.94Hz/60Hz | 4:3 | 4:9 |
| 9 | 720(1440)×240p | 59.94Hz/60Hz | 16:9 | 16:27 |
| 10 | 2880×480i | 59.94Hz/60Hz | 4:3 | 2:9 – 20:9[3] |
| 11 | 2880×480i | 59.94Hz/60Hz | 16:9 | 8:27 – 80:27 |
| 12 | 2880×240p | 59.94Hz/60Hz | 4:3 | 1:9 – 10:9 |
| 13 | 2880×240p | 59.94Hz/60Hz | 16:9 | 4:27 – 40:27 |
| 14 | 1440×480p | 59.94Hz/60Hz | 4:3 | 4:9 |
| 15 | 1440×480p | 59.94Hz/60Hz | 16:9 | 16:27 |
| 16 | 1920×1080p | 59.94Hz/60Hz | 16:9 | 1:1 |
| 17 | 720×576p | 50Hz | 4:3 | 16:15 |
| 18 | 720×576p | 50Hz | 16:9 | 64:45 |
| 19 | 1280×720p | 50Hz | 16:9 | 1:1 |
| .... | .... | .... | .... | .... |

FIG. 10

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1 | 24-bit IEEE Registration Identifier (0x000C03) (least significant byte first) | | | | | | | |
| 2 | | | | | | | | |
| 3 | | | | | | | | |
| ... | ... | | | | | | | |
| (13) | 3D_present | ... | | | | | | 3D_not_conv |
| (14) | HDMI_3D_LEN | | | | | | | |
| ... | ... | | | | | | | |
| | 2D_VIC_order_1 | | | | 3D_Structure_1 | | | |
| | 3D_Detail_1 | | | | Rrserved(0) | | | |
| ... | ... | | | | ... | | | |
| | 2D_VIC_order_L | | | | 3D_Structure_L | | | |
| ...N | Rrserved(0) | | | | | | | |

FIG. 11

| Value | Meaning |
|---|---|
| ... | ... |
| 0110 | Top-and Bottom |
| ... | ... |
| 1111 | Not in use |

IMAGE DATA TRANSMISSION APPARATUS, IMAGE DATA TRANSMISSION METHOD, AND IMAGE DATA RECEIVING APPARATUS

CROSS-REFERENCES TO RELATED APPLICATIONS

The present application is a national phase entry under 35 U.S.C. §371 of International Application No. PCT/JP2011/056861 filed Mar. 22, 2011, published on Sep. 29, 2011 as WO 2011/118592 A1, which claims priority from Japanese Patent Application No. JP 2010-070571 filed in the Japanese Patent Office on Mar. 25, 2010.

TECHNICAL FIELD

The present invention relates to an image data transmission apparatus, an image data transmission method, and an image data receiving apparatus, and more particularly, relates to an image data transmission apparatus for transmitting stereoscopic image data received from a broadcast station or the like to external devices, and the like.

2. Background Art

It has hitherto been known that stereoscopic image data for displaying stereoscopic image data from a broadcast station is transmitted, this stereoscopic image data is received using a set top box (STB), and then, the stereoscopic image data is transmitted from this set top box to a television receiver (TV) in accordance with a digital interface, such as one conforming to an HDMI (High Definition Multimedia Interface) standard. For example, NPL 1 describes the details of the HDMI standard.

Examples of the transmission formats of the stereoscopic image data from a broadcast station include a "Frame Sequential" method, a "Top & Bottom" method, and a "Side By Side" method. In the Frame Sequential method, left-eye image data and right-eye image data are switched in sequence for each frame and are transmitted. Furthermore, in the "Top & Bottom" method, for the first half of the screen in the vertical direction, data of each line of the left-eye image data is transmitted, and for the second half of the screen in the vertical direction, data of each line of the right-eye image data is transmitted. In addition, in the "Side By Side" method, for the first half of the screen in the horizontal direction, the pixel data of the left-eye image data is transmitted, and for the second half of the screen in the horizontal direction, the pixel data of the right-eye image data is transmitted.

Hitherto, in a set top box, a process for converting stereoscopic image data from a broadcast station into a prespecified format has been performed, and the stereoscopic image data after being processed has been transmitted to a television receiver. Then, inside the television receiver, the stereoscopic image data is converted into a format that conforms to the display resolution and is used.

FIG. 12 illustrates an example of changes of formats of stereoscopic image data in the flow of processing of a broadcast station, a set top box, and a television receiver.

For example, stereoscopic image data in 720P of 1280×720 is transmitted from a broadcast station. In the set top box, a format conversion process is performed on this stereoscopic image data so that the stereoscopic image data becomes stereoscopic image data in 1080i of 1920×540, and the stereoscopic image data is then transmitted to a television receiver. In the television receiver, a format conversion process is performed on this stereoscopic image data so that the stereoscopic image data becomes stereoscopic image data in 1080P of 1920×1080.

Furthermore, for example, stereoscopic image data of T&B (Top & Bottom) in 720P of 1280×720 is transmitted from a broadcast station. In a set top box, a format conversion process is performed on the stereoscopic image data so that the stereoscopic image data becomes stereoscopic image data of T&B in 1080i of 1920×540, and the stereoscopic image data is transmitted to the television receiver. In the television receiver, a format conversion process is performed on this stereoscopic image data so that the stereoscopic image data becomes stereoscopic image data in 1080P of 1920×1080.

Furthermore, for example, stereoscopic image data of SBS (Side By Side) in 720P of 1280×720 is transmitted from a broadcast station. In the set top box, a format conversion process is performed on this stereoscopic image data so that the stereoscopic image data becomes stereoscopic image data in 1080i SBS of 1920×540, and the stereoscopic image data is transmitted to the television receiver. In the television receiver, a format conversion process is performed on this stereoscopic image data so that the stereoscopic image data becomes stereoscopic image data in 1080P of 1920×1080.

CITATION LIST

Non Patent Literature

NPL 1: High-Definition Multimedia Interface Specification Version 1.4, Jun. 5, 2009

SUMMARY OF INVENTION

Technical Problem

In the above-mentioned examples of changes of the formats of the stereoscopic image data in the flow of processing of the broadcast station, the set top box, and the television receiver, since the number of lines is reduced to 540 lines in the set top box, image quality deterioration is caused. In particular, in the case of stereoscopic image data of T&B (Top & Bottom), as a result of the number of lines being reduced to ¼ (270/1080) with respect to the final number of lines used in the television receiver, image quality deterioration becomes conspicuous.

An object of the present invention is to prevent image quality deterioration due to unnecessary format conversion.

Solution to Problem

The concept of this invention lies in an image data transmission apparatus including:

an image data receiving unit configured to receive stereoscopic image data for displaying a stereoscopic image; and an image data transmission unit configured to transmit the stereoscopic image data received by the image data receiving unit to an external device through a transmission path, wherein the image data transmission unit transmits, when a format of the stereoscopic image data received by the image data receiving unit is a format that can be handled by the external device, and the external device has requested that transmission of the stereoscopic image data be performed without performing format conversion, the stereoscopic image data received by the image data receiving unit to the external device without performing format conversion.

In this invention, stereoscopic image data for displaying a stereoscopic image is received by the image data receiving unit. In the image data receiving unit, for example, reception of stereoscopic image data is performed from a broadcast signal. Furthermore, in the image data receiving unit, for example, reception of stereoscopic image data is performed through a network from a streaming server. This stereoscopic image data is transmitted to an external device through a transmission path by the image data transmission unit. The stereoscopic image data is transmitted to an external device through a transmission path by using, for example, a differential signal. A connection is made to the external device through, for example, a digital interface, such as HDMI.

In the image data transmission unit, when the format of the stereoscopic image data received by the image data receiving unit is a format that can be handled by the external device, the stereoscopic image data received by the image data receiving unit is transmitted to the external device without performing format conversion. As a consequence, in this invention, it is possible to transmit the stereoscopic image data received by the image data receiving unit to the external device without performing unnecessary format conversion, and it is possible to prevent image quality deterioration.

In this invention, for example, when the format of the stereoscopic image data received by the image data receiving unit is a format that can be handled by the external device, and the external device has requested that transmission of the stereoscopic image data be performed without performing format conversion, the stereoscopic image data received by the image data receiving unit may be transmitted to the external device without converting the format. In this case, even if the format of the stereoscopic image data received by the image data receiving unit is a format that can be handled by the external device, when the external device has not requested that transmission of the stereoscopic image data be performed in an as-is format, for example, the stereoscopic image data is converted into a preset predetermined format and is transmitted.

In this invention, for example, the image data transmission unit may read and obtain, through a transmission path from the storage unit provided in the external device, the format information of the stereoscopic image data that can be handled by the external device and information as to whether or not the external device has requested that transmission of the stereoscopic image data be performed without performing format conversion. In this case, the time and effort of inputting information by a user can be eliminated, and the ease of use for the user can be improved.

Furthermore, in this invention, for example, when the format of the stereoscopic image data received by the image data receiving unit is a format that can be handled by the external device and the external device has requested that transmission of the stereoscopic image data be performed without performing format conversion, when the image data transmission unit obtains permission of the user, the image data transmission unit may transmit the stereoscopic image data received by the image data receiving unit to the external device without performing format conversion. In this case, even if the format of the stereoscopic image data received by the image data receiving unit is a format that can be handled by the external device, when the user does not give his/her permission, for example, the stereoscopic image data is converted into a preset predetermined format and is transmitted.

Furthermore, in this invention, when the format of the stereoscopic image data received by the image data receiving unit is not a format that can be handled by the external device or the external device has not requested that transmission of the stereoscopic image data be performed, the image data transmission unit may convert the stereoscopic image data received by the image data receiving unit into a preset format and transmit it to the external device. In this case, since the stereoscopic image data is converted into a preset format and is transmitted to the external device, handling in the external device becomes possible.

Furthermore, another concept of this invention lies in an image data receiving apparatus including:

an image data receiving unit configured to receive stereoscopic image data for displaying a stereoscopic image through a transmission path from an external device; and a storage unit configured to store at least format information of stereoscopic image data that can be handled and information about whether or not the stereoscopic image data is transmitted without performing format conversion, these two types of information being capable of being read by the external device through the transmission path.

In this invention, a data receiving unit and a storage unit are included. The data receiving unit receives stereoscopic image data for displaying a stereoscopic image through a transmission path from an external device. The storage unit has stored therein, in such a manner that the external device can read, at least the format information of the stereoscopic image data that can be handled, and information as to whether or not the transmission of the stereoscopic image data has been requested without performing format conversion.

The external device reads information from the storage unit, and thus can understand the format of the stereoscopic image data that can be handled, and furthermore can understand whether or not the transmission of stereoscopic image data has been requested without performing format conversion. As a consequence, for example, in a case where the format of the received stereoscopic image data is a format that can be handled, and the transmission of the stereoscopic image data in an as-is format has been requested, the external device transmits the relevant received stereoscopic image data in an as-is format. As a consequence, in this invention, it is possible for the external device to transmit the received stereoscopic image data without performing unnecessary format conversion, and to prevent image quality deterioration due to format conversion.

Advantageous Effects of Invention

According to this invention, on the transmission side that has received stereoscopic image data, it is possible to transmit the stereoscopic image data to the receiving side without performing unnecessary format conversion, and it is possible to prevent image quality deterioration due to format conversion.

BRIEF DESCRIPTION OF DRAWINGS

FIG. 8 illustrates the details of each "CEA Short Video Descriptor" of "Video Data Block".

FIG. 9 illustrates the correspondence (partially extracted) between "Video Format" and "Video Identification Code (Video ID Code).

FIG. 10 illustrates the structure of Vendor Specific Data Block (VSDB) in the EDID structure.

FIG. 11 illustrates a 3D format indicated by each value of "3D_structure".

DESCRIPTION OF EMBODIMENTS

Hereinafter, modes for carrying out the invention (hereinafter referred to as an "embodiment") will be described. Meanwhile, the description will be given in the following order.

1. Embodiment
2. Modification

1. Embodiment

[Example of Configuration of Stereoscopic Image Display System]

Figure 1:
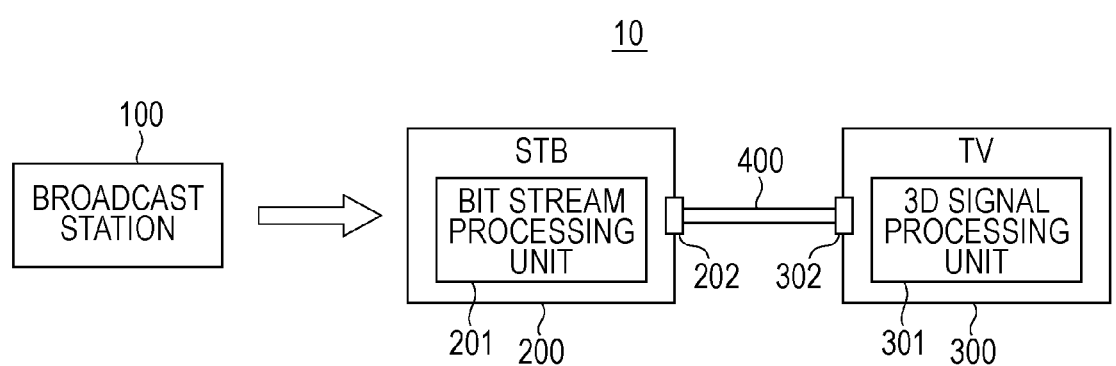
FIG. 1 is a block diagram illustrating an example of the configuration of a stereoscopic image display system according to an embodiment of this invention.

FIG. 1 illustrates an example of the configuration of a stereoscopic image display system 10 according to an embodiment. The stereoscopic image display system 10 includes a broadcast station 100, a set top box (STB) 200, and a television receiver 300.

The set top box 200 and the television receiver 300 are connected to each other through an HDMI (High Definition Multimedia Interface) cable 400. The set top box 200 is provided with an HDMI terminal 202. The television receiver 300 is provided with an HDMI terminal 302. One end of the HDMI cable 400 is connected to the HDMI terminal 202 of the set top box 200, and the other end of the HDMI cable 400 is connected to the HDMI terminal 302 of the television receiver 300.

[Description of Broadcast Station]

The broadcast station 100 transmits bit stream data in such a manner as to be carried on a broadcast wave. The bit stream data contains stereoscopic image data for displaying a stereoscopic image, audio data corresponding to the stereoscopic image data, and the like. Examples of the transmission formats of the stereoscopic image data from the broadcast station include a "Frame Sequential" method, a "Top & Bottom" method, and a "Side By Side" method.

[Description of Set Top Box]

The set top box 200 receives bit stream data (transport stream) that is transmitted in such a manner as to be carried on a broadcast wave from the broadcast station 100. This bit stream data, as described above, contains stereoscopic image data, audio data, and the like. The set top box 200 includes a bit stream processing unit 201. The bit stream processing unit 201 extracts stereoscopic image data, audio data, and the like from the bit stream data.

Figure 2:
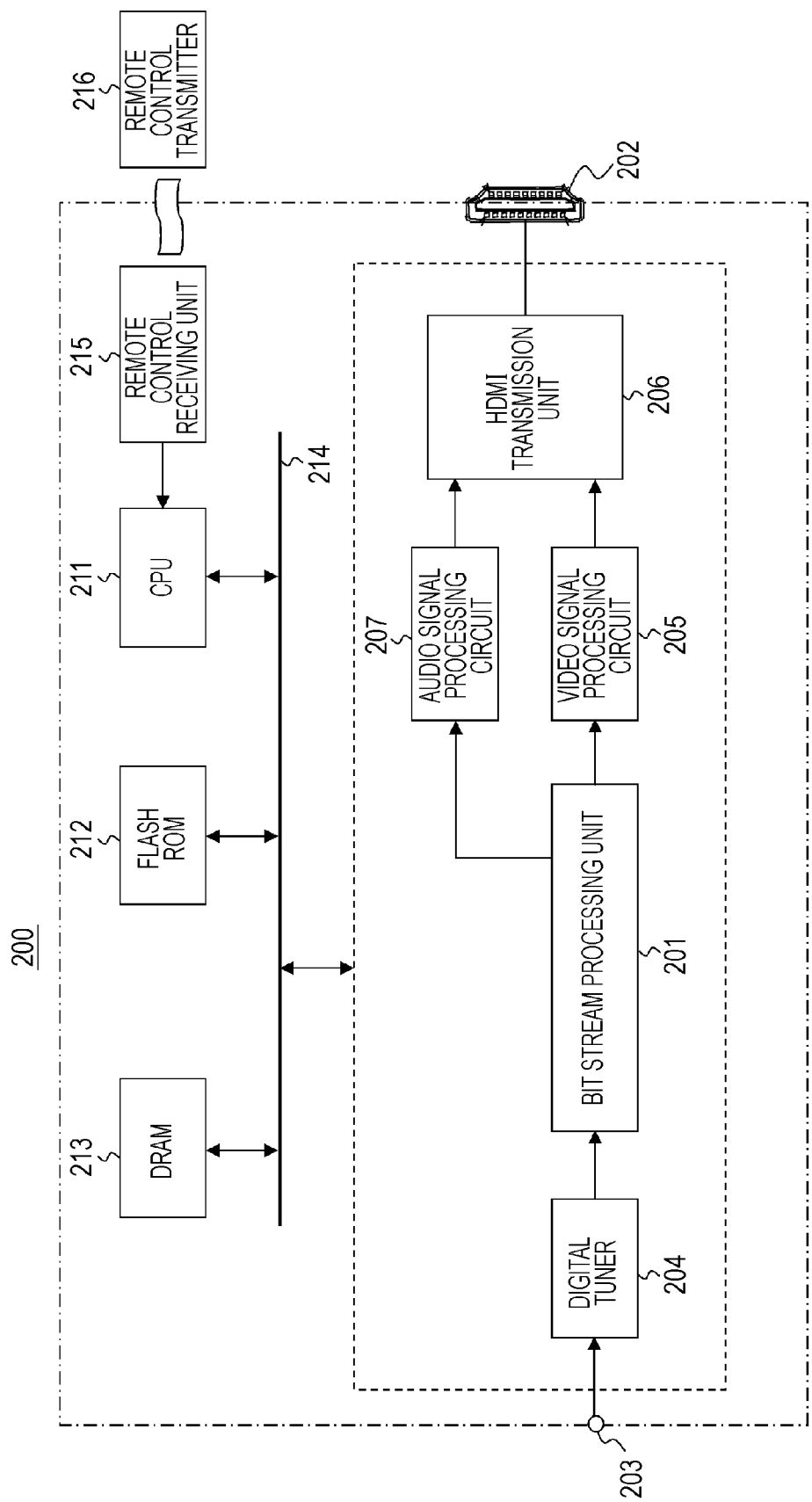
FIG. 2 is a block diagram illustrating an example of the configuration of a set top box forming the stereoscopic image display system.

FIG. 2 illustrates an example of the configuration of the set top box 200. The set top box 200 includes the bit stream processing unit 201, an HDMI terminal 202, an antenna terminal 203, a digital tuner 204, a video signal processing circuit 205, an HDMI transmission unit 206, and an audio signal processing circuit 207. Furthermore, the set top box 200 includes a CPU 211, a flash ROM 212, a DRAM 213, an internal bus 214, a remote control receiving unit 215, and a remote control transmitter 216.

The CPU 211 controls the operation of each unit of the set top box 200. The flash ROM 212 performs the storage of control software and the saving of data. The DRAM 213 forms a work area for the CPU 211. The CPU 211 develops the data and the software that are read from the flash ROM 212 onto the DRAM 213, so that the software is started up so as to control each unit of the set top box 200.

The remote control receiving unit 215 receives a remote control signal (remote control code) transmitted from the remote control transmitter 216, and supplies the remote control signal to the CPU 211. The CPU 211 controls each unit of the set top box 200 on the basis of the remote control code. The CPU 211, the flash ROM 212, and the DRAM 213 are connected to the internal bus 214.

The antenna terminal 203 is a terminal for inputting a television broadcast signal received by the receiving antenna (not shown). The digital tuner 204 processes the television broadcast signal input to the antenna terminal 203, and outputs predetermined bit stream data (transport stream) corresponding to the selection channel of the user.

The bit stream processing unit 201, as described above, extracts stereoscopic image data, audio data, and the like from the bit stream data. The video signal processing circuit 205 performs an image quality adjustment process, a format conversion process, and the like on the stereoscopic image data (received stereoscopic image data) output from the bit stream processing unit 201, and supplies the stereoscopic image data after being processed to the HDMI transmission unit 206.

In the following case, the video signal processing circuit 205 supplies the format of the received stereoscopic image data in an as-is format to the HDMI transmission unit 206 without performing format conversion. That is, it is a case in which handling is possible by the television receiver 300, and the television receiver 300 has requested that the transmission thereof is performed without performing format conversion. Furthermore, in other cases, the video signal processing circuit 205 converts the format of the received stereoscopic image data into, for example, a format that is set in advance by the user, and supplies the received stereoscopic image data to the HDMI transmission unit 206.

A case in which, for example, the format of the received stereoscopic image data is "720P T&B (Top & Bottom) of 1280×720" will be considered. In this case, under the following conditions, the video signal processing circuit 205 supplies the received stereoscopic image data in an as-is format to the HDMI transmission unit 206. "These conditions" are that the television receiver 300 can handle the format of "720P T&B of 1280×720" and moreover the television receiver 300 has requested that transmission of the stereoscopic image data be performed without performing format conversion.

Figure 12:
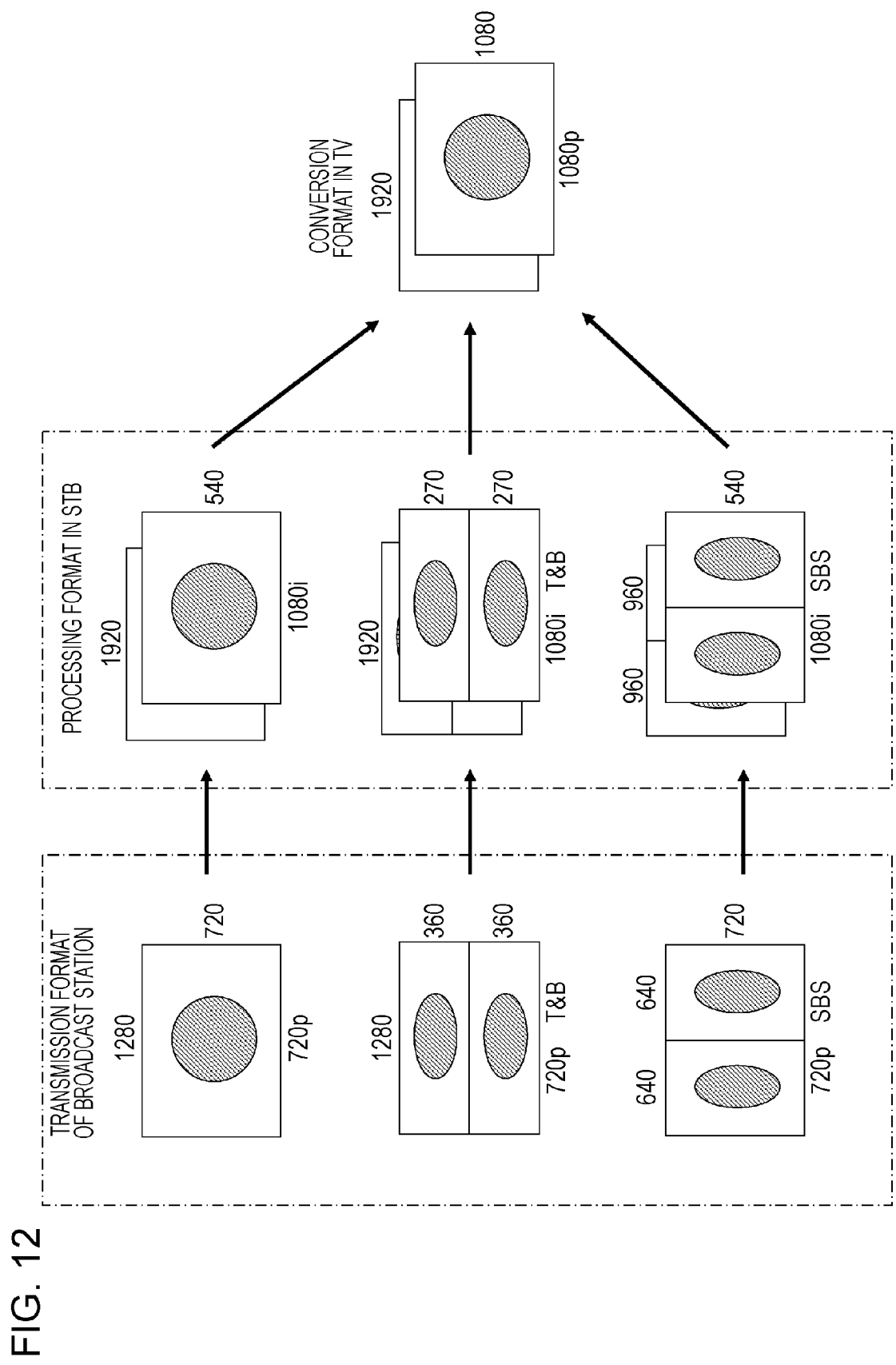
FIG. 12 illustrates examples of changes of the formats of stereoscopic image data in the flow of processing of processing of a broadcast station, a set top box, and a television receiver.

Furthermore, in this case, under the following conditions, the video signal processing circuit 205 converts the received stereoscopic image data into, for example, a format "1080i T&B of 1280×540", and supplies the stereoscopic image data to the HDMI transmission unit 206 (see FIG. 12). These conditions are that the television receiver 300 cannot handle the format of "720P T&B of 1280×720". Furthermore, in this case, under the following conditions, the video signal processing circuit 205 converts the received stereoscopic image data into, for example, a format of "1080i T&B of 1280×540", and supplies it to the HDMI transmission unit 206 (see FIG. 12). These conditions are that even though the television receiver 300 can handle the format of "720P T&B of 1280×720", the television receiver 300 has not requested that transmission of the stereoscopic image data be performed without performing format conversion.

The above-described format conversion process in the video signal processing circuit 205 is performed under the control of the CPU 211. The CPU 211 obtains E-EDID (Enhanced Extended Display Identification Data) from the television receiver 300, as will be described later. Then, the CPU 211 performs control on the basis of the format information of the stereoscopic image data that can be handled, which is contained in the E-EDID, and information (request information) indicating whether or not the transmission of the stereoscopic image data is performed without performing format conversion.

Figure 3:
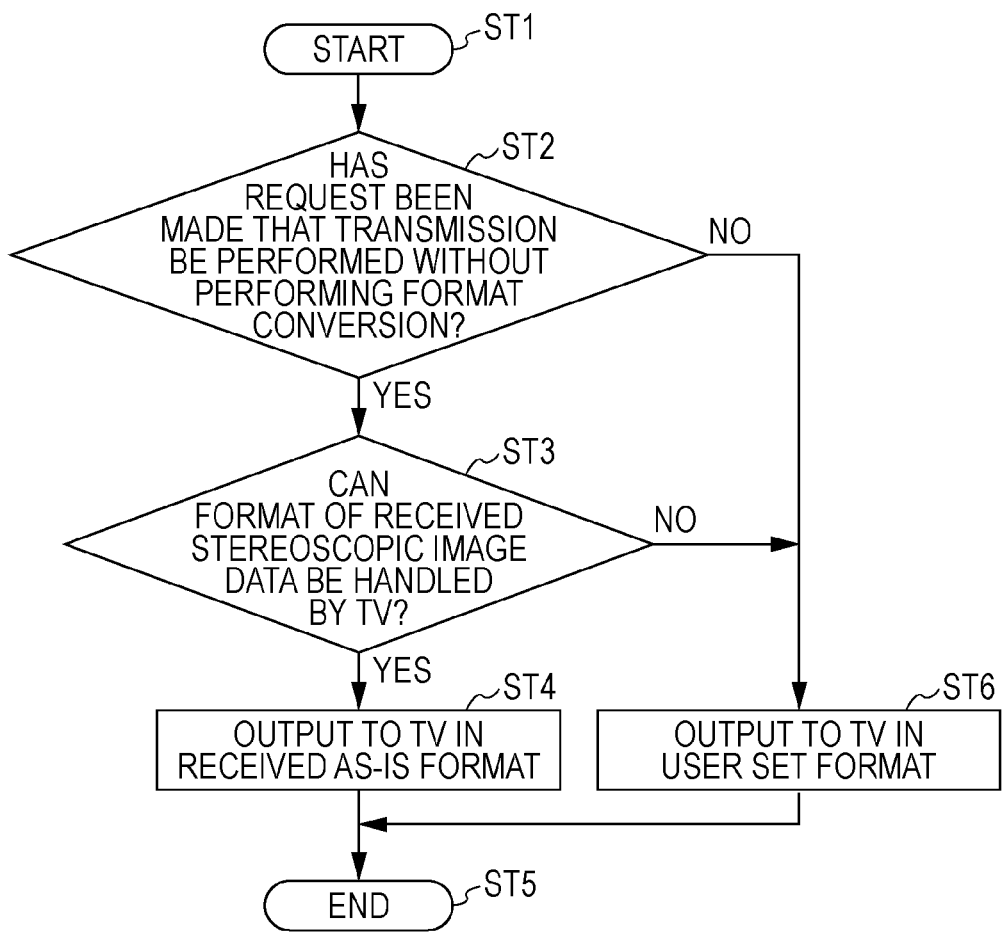
FIG. 3 is a flowchart illustrating an example of the procedure of a format conversion control process by a CPU.

The flowchart of FIG. 3 illustrates an example of the procedure of the control process of the CPU 211. The CPU 211 starts processing in step ST1, and after that, proceeds to the process of step ST2. In step ST2, the CPU 211 determines whether or not the television receiver 300 has requested that transmission of the stereoscopic image data be performed without performing format conversion on the basis of the request information. When the television receiver 300 has requested that transmission of the stereoscopic image data be performed without performing format conversion, the CPU 211 proceeds to the process of step ST3.

In step ST3, the CPU 211 determines whether or not the format of the received stereoscopic image data is a format that can be handled by the television receiver 300 on the basis of the format information. When the format is a format that can be handled, the CPU 211 determines in step ST4 that the received stereoscopic image data is output to the television receiver 300 in the as-is format. In this case, the CPU 211 controls the video signal processing circuit 205 so that the received stereoscopic image data is supplied to the HDMI transmission unit 206 in the as-is format. After the process of step ST4, in step ST5, the CPU 211 ends the control process.

When the television receiver 300 has not requested in step ST2 that the stereoscopic image data be transmitted without performing format conversion, the CPU 211 proceeds to the process of step ST6. Furthermore, in step ST3, when the format of the received stereoscopic image data is not a format that can be handled by the television receiver 300, the CPU 211 proceeds to the process of step ST6. In step ST6, the CPU 211 determines that the format of the received stereoscopic image data is converted into a user set format, and that the stereoscopic image data is output to the television receiver 300. In this case, the CPU 211 controls the video signal processing circuit 205 so that the format of the received stereoscopic image data is converted into a user set format, and the stereoscopic image data is supplied to the HDMI transmission unit 206. After the process of step ST6, the CPU 211 ends the control process in step ST5.

Figure 4:
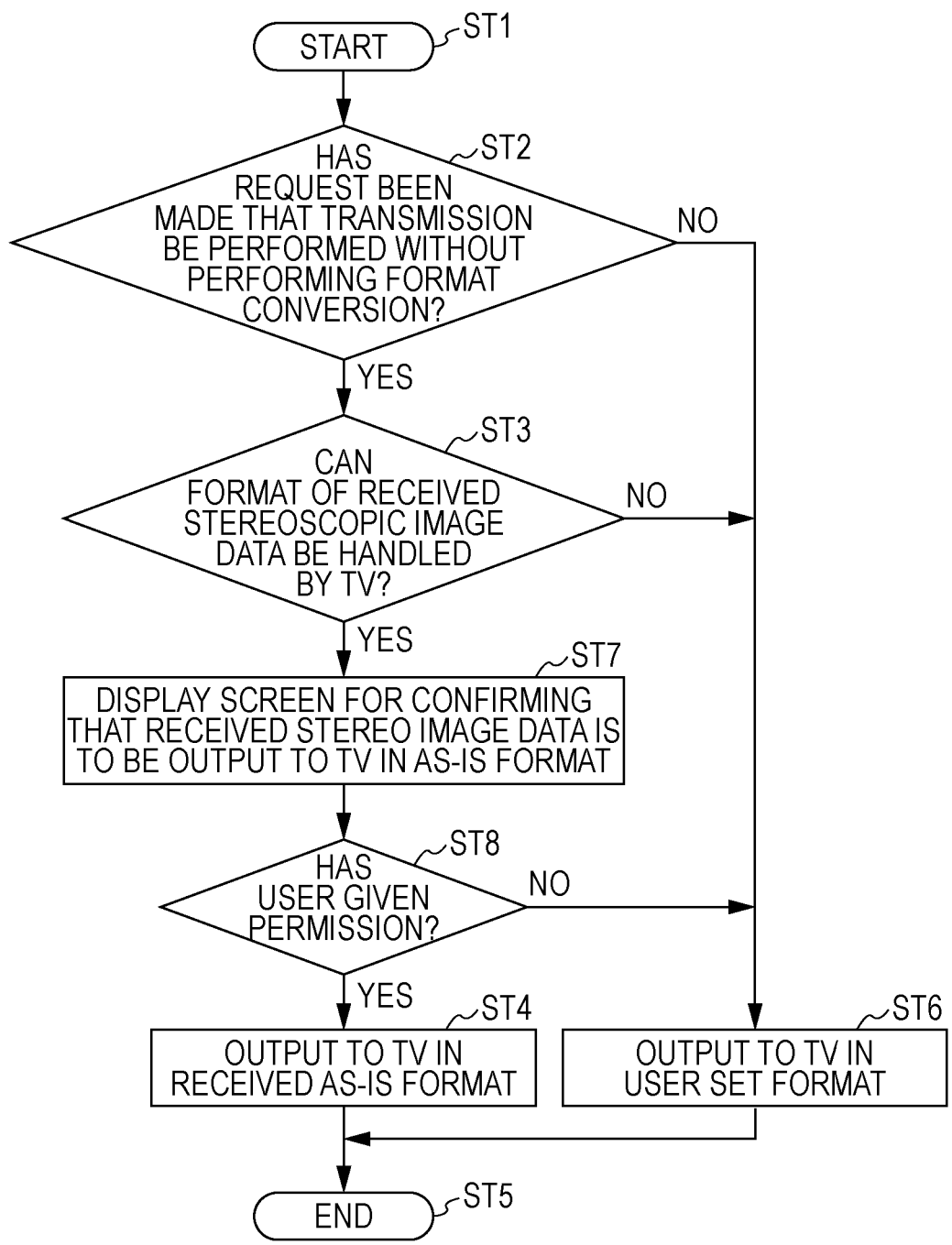
FIG. 4 is a flowchart illustrating another example of the procedure of a format conversion control process by the CPU.

Furthermore, the flowchart of FIG. 4 illustrates another example of the procedure of the control process of the CPU 211. In FIG. 4, steps corresponding to those in FIG. 3 are shown with the same reference numerals. When it is determined in step ST3 that the format of the received stereoscopic image data is a format that can be handled by the television receiver 300, the CPU 211 proceeds to the process of step ST7. In step ST7, the CPU 211 performs display of a confirmation screen. This confirmation screen is used to make a user confirm that the received stereoscopic image data is output to the television receiver 300 in the as-is format. This confirmation screen is displayed on the television receiver 300. In this case, the video signal processing circuit 205 is controlled so that image data on which a display signal for the confirmation screen has been superposed is transmitted to the HDMI transmission unit 206.

Next, the CPU 211 proceeds to the process of step ST8. In step ST8, the CPU 211 determines whether or not the user has permitted that the received stereoscopic image data is output to the television receiver 300 in the as-is format. When the user gives his/her permission, the CPU 211 proceeds to the process of step ST4, and determines that the received stereoscopic image data is output to the television receiver 300 in the as-is format. On the other hand, when the user does not give his/her permission, in step ST6, the CPU 211 determines that the format of the received stereoscopic image data is converted into a user set format and outputs the received stereoscopic image data to the television receiver 300.

The processing of the remaining steps of the flowchart of FIG. 4 is the same as the processing of the corresponding steps in the flowchart of FIG. 3. As described above, in the control process of the flowchart of FIG. 4, under the following conditions, the video signal processing circuit 205 is controlled so that the received stereoscopic image data is converted into a user set format and is transmitted. These conditions are that the television receiver 300 has requested that transmission of the stereoscopic image data be performed without performing format conversion, and moreover the user does not give his/her permission even if the format of the received stereoscopic image data is a format that can be handled by the television receiver 300.

The audio signal processing circuit 207 performs a sound quality adjustment process and the like as necessary on the audio data output from the bit stream processing unit 201, and supplies the audio data after the process to the HDMI transmission unit 206. The HDMI transmission unit 206 sends the stereoscopic image data and the audio data of the baseband from the HDMI terminal 202 in accordance with the communication in compliance with HDMI. The HDMI transmission unit 206 is in a state of being capable of handing stereoscopic image data. In order to transmit the data through a TMDS channel of HDMI, the HDMI transmission unit 206 packs image and audio data, and outputs the data to the HDMI terminal 202. The details of the HDMI transmission unit 206 will be described later.

The operation of the set top box 200 will be briefly described. A television broadcast signal input to the antenna terminal 203 is supplied to the digital tuner 204. In this digital tuner 204, the television broadcast signal is processed, and predetermined bit stream data (transport stream) corresponding to the selection channel of the user is output.

The bit stream data output from the digital tuner 204 is supplied to the bit stream processing unit 201. In this bit stream processing unit 201, stereoscopic image data, audio data, and the like, which are contained in the bit stream data, are extracted. The stereoscopic image data output from the bit stream processing unit 201 is supplied to the video signal processing circuit 205. In the video signal processing circuit 205, an image quality adjustment process, a format conversion process, and the like are performed on the stereoscopic image data (received stereoscopic image data) output from the bit stream processing unit 201.

The stereoscopic image data after being processed, which is output from the video signal processing circuit 205, is supplied to the HDMI transmission unit 206. Furthermore, the audio data obtained in the bit stream processing unit 201, after a sound quality adjustment process and the like are performed thereon as necessary by the audio signal processing circuit 207, is supplied to the HDMI transmission unit 206. In the HDMI transmission unit 206, the stereoscopic image data and the audio data are packed and sent to the HDMI cable 400 from the HDMI terminal 202.

[Description of Television Receiver]

Referring back to FIG. 1, the television receiver 300 receives stereoscopic image data that is sent through the HDMI cable 400 from the set top box 200. The television receiver 300 includes a 3D signal processing unit 301. The 3D signal processing unit 301 performs a process (decoding process) corresponding to the transmission method on the stereoscopic image data so as to obtain left-eye image data and right-eye image data.

Figure 5:
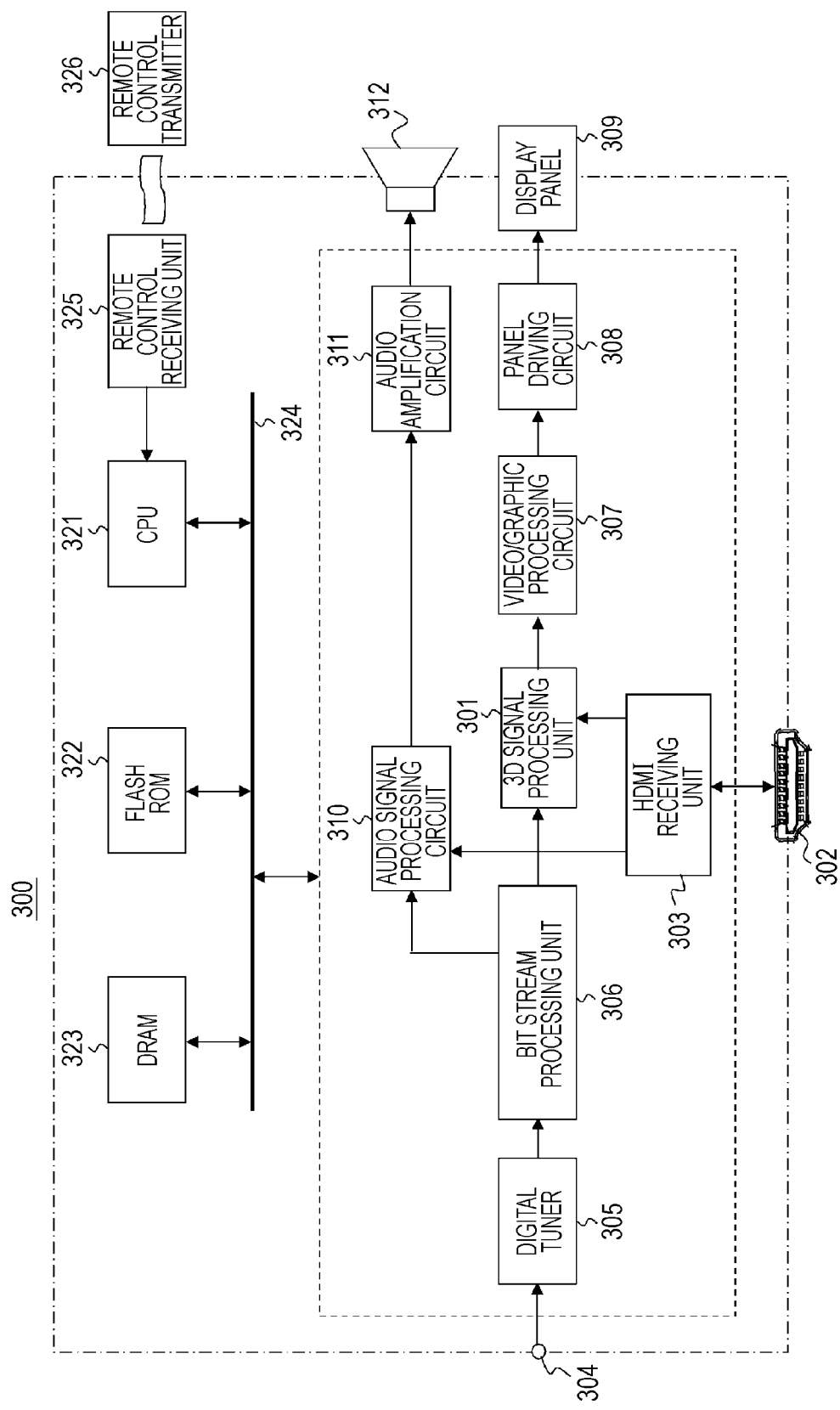
FIG. 5 is a block diagram illustrating an example of the configuration of a television receiver forming the stereoscopic image display system.

FIG. 5 illustrates an example of the configuration of the television receiver 300. The television receiver 300 includes the 3D signal processing unit 301, an HDMI terminal 302, an HDMI receiving unit 303, an antenna terminal 304, a digital tuner 305, and a bit stream processing unit 306. Furthermore, the television receiver 300 includes a video/graphic processing circuit 307, a panel driving circuit 308, a display panel 309, an audio signal processing circuit 310, an audio amplification circuit 311, and a speaker 312. Furthermore, the television receiver 300 includes a CPU 321, a flash ROM 322, a DRAM 323, an internal bus 324, a remote control receiving unit 325, and a remote control transmitter 326.

The CPU 321 controls the operation of each unit of the television receiver 300. The flash ROM 322 performs the storage of control software and the saving of data. The DRAM 323 forms a work area for the CPU 321. The CPU 321 develops software and data read from the flash ROM 322 onto the DRAM 323 so that the software is started up to control each unit of the television receiver 300.

The remote control receiving unit 325 receives a remote control signal (remote control code) transmitted from the remote control transmitter 326, and supplies the remote control signal to the CPU 321. The CPU 321 controls each unit of the television receiver 300 on the basis of the remote control code. The CPU 321, the flash ROM 322, and the DRAM 323 are connected to the internal bus 324.

The antenna terminal 304 is a terminal through which a television broadcast signal received by a receiving antenna (not shown) is input. The digital tuner 305 processes the television broadcast signal input to the antenna terminal 304, and outputs predetermined bit stream data (transport stream) corresponding to the selection channel of the user.

The bit stream processing unit 306 has a configuration identical to that of the bit stream processing unit 201 of the set top box 200 shown in FIG. 2. The bit stream processing unit 306 extracts stereoscopic image data, audio data, and the like from the bit stream data. The HDMI receiving unit 303 receives the stereoscopic image data and the audio data, which are supplied to the HDMI terminal 302 through the HDMI cable 400 in accordance with communication in compliance with HDMI. The HDMI receiving unit 303 is in a state of capable of handing stereoscopic image data. The details of the HDMI receiving unit 303 will be described later.

The 3D signal processing unit 301 performs a decoding process on the stereoscopic image data that is received by the HDMI receiving unit 303 or obtained by the bit stream processing unit 306, and generates left-eye image data and right-eye image data. In this case, the 3D signal processing unit 301 performs a decoding process corresponding to the format of the stereoscopic image data on the stereoscopic image data. The video/graphic processing circuit 307 generates image data for displaying a stereoscopic image on the basis of the left-eye image data and the right-eye image data that are generated by the 3D signal processing unit 301.

Furthermore, the video/graphic processing circuit 307 performs an image quality adjustment process on the image data as necessary. Furthermore, the video/graphic processing circuit 307 combines data of superimposition information, such as a menu and a program table, as necessary with the image data. The panel driving circuit 308 drives the display panel 309 on the basis of the image data output from the video/graphic processing circuit 307. The display panel 309 is made up of, for example, an LCD (Liquid Crystal Display) or a PDP (Plasma Display Panel).

The audio signal processing circuit 310 performs a necessary process, such as D/A conversion, on the audio data that is received by the HDMI receiving unit 303 or obtained by the bit stream processing unit 306. The audio amplification circuit 311 amplifies the audio signal output from the audio signal processing circuit 310 and supplies the audio signal to the speaker 312.

The operation of the television receiver 300 shown in FIG. 5 will be briefly described. In the HDMI receiving unit 303, the stereoscopic image data and the audio data that are transmitted from the set top box 200 that is connected to the HDMI terminal 302 through the HDMI cable 400 are received. The stereoscopic image data received by the HDMI receiving unit 303 is supplied to the 3D signal processing unit 301. Furthermore, the audio data received by the HDMI receiving unit 303 is supplied to the audio signal processing circuit 310.

A television broadcast signal input to the antenna terminal 304 is supplied to the digital tuner 305. In this digital tuner 305, the television broadcast signal is processed, and predetermined bit stream data (transport stream) corresponding to the selection channel of the user is output.

The bit stream data output from the digital tuner 305 is supplied to the bit stream processing unit 306. In the bit stream processing unit 306, stereoscopic image data, audio data, and the like are extracted from the bit stream data. The stereoscopic image data extracted by the bit stream processing unit 306 is supplied to the 3D signal processing unit 301. Furthermore, the audio data extracted by the bit stream processing unit 306 is supplied to the audio signal processing circuit 310.

In the 3D signal processing unit 301, a decoding process is performed on the stereoscopic image data received by the HDMI receiving unit 303 or extracted by the bit stream processing unit 306, and left-eye image data and right-eye image data are generated. The left-eye image data and the right-eye image data are supplied to the video/graphic processing circuit 307. In the video/graphic processing circuit 307, image data for displaying a stereoscopic image is generated on the basis of the left-eye image data and the right-eye image data, and an image quality adjustment process and a superimposition information data combining process are also performed as necessary.

The image data obtained by the video/graphic processing circuit 307 is supplied to the panel driving circuit 308. As a consequence, a stereoscopic image is displayed on the display panel 309. For example, on the display panel 309, a left-eye image using left-eye image data and a right-eye image using right-eye image data are alternately displayed in a time-division manner. A viewer, by wearing shutter glasses in which a left eye shutter and a right-eye shutter alternately open in synchronization with the display of the display panel 309, can view only the left-eye image with the left eye and only the right-eye image with the right eye, and is thereby capable of perceiving a stereoscopic image.

Furthermore, in the audio signal processing circuit 310, a necessary process, such as D/A conversion, is performed on the audio data that is received by the HDMI receiving unit 303 or extracted by the bit stream processing unit 306. This audio data is amplified by the audio amplification circuit 311 and thereafter is supplied to the speaker 312. As a consequence, audio corresponding to the display image of the display panel 309 is output from the speaker 312.

[Example of Configuration of HDMI Transmission Unit and HDMI Receiving Unit]

Figure 6:
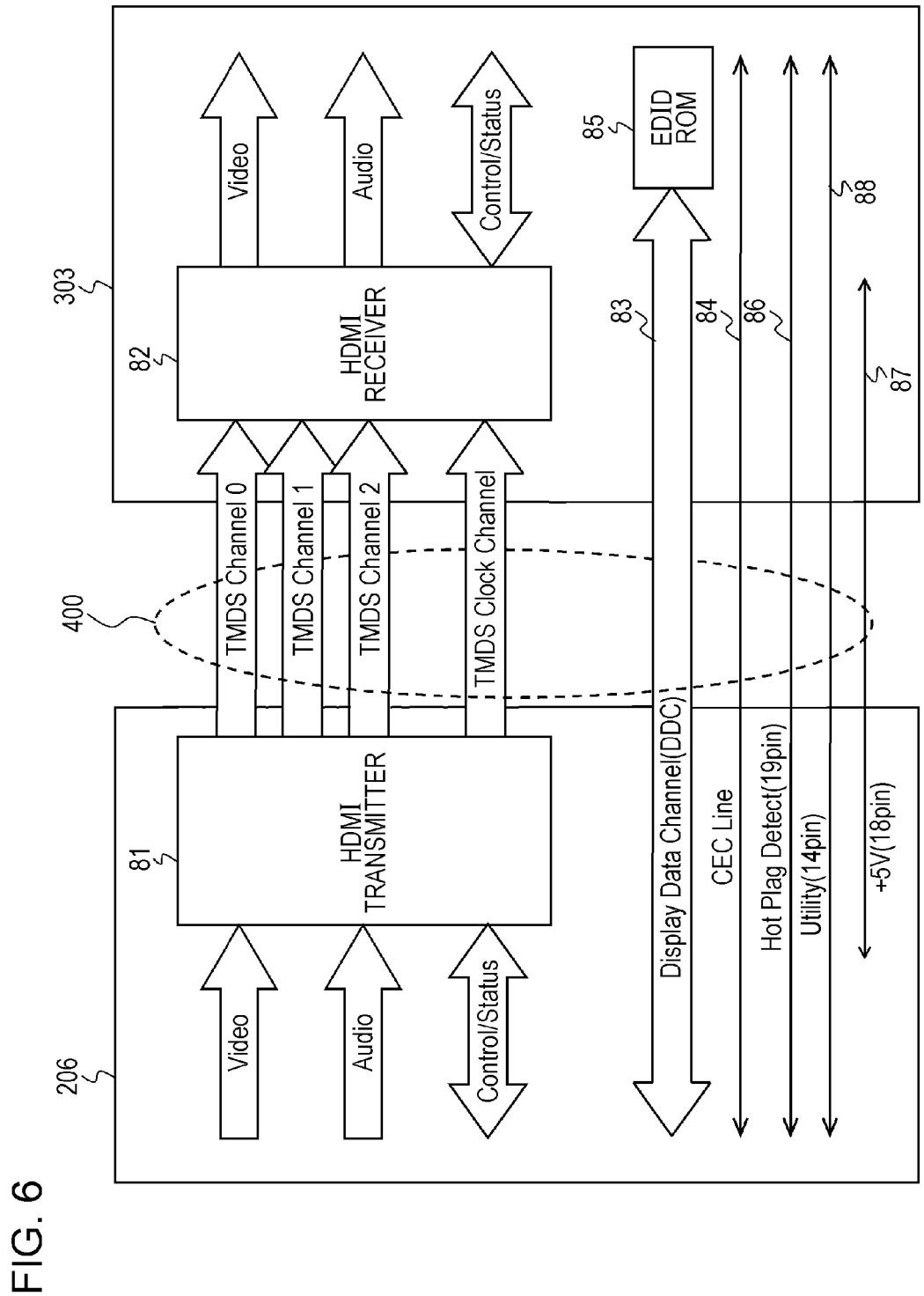
FIG. 6 illustrates an example of the configurations of an HDMI transmission unit (HDMI source) of a set top box and an HDMI receiving unit (HDMI sink) of a television receiver in the stereoscopic image display system.

FIG. 6 illustrates an example of the configuration of the HDMI transmission unit (HDMI source) 206 of the set top box 200 and the HDMI receiving unit (HDMI sink) 303 of the television receiver 300 in the stereoscopic image display system 10 of FIG. 1.

In an effective image section (hereinafter will also be referred to as an active video section as appropriate), the HDMI transmission unit 206 transmits a differential signal corresponding to non-compressed pixel data of an image for the amount of one screen to the HDMI receiving unit 303 in one direction through a plurality of channels. Here, the effective image section is a section in which the horizontal blanking period and the vertical blanking period are excluded from the section from one vertical synchronization signal up to the next vertical synchronization signal. Furthermore, in the horizontal blanking period or in the vertical blanking period, the HDMI transmission unit 206 transmits a differential signal corresponding to at least audio data and control data accompanying an image, other auxiliary data, and the like to the HDMI receiving unit 303 in one direction through a plurality of channels.

Examples of transmission channels of the HDMI system constituted by the HDMI transmission unit 206 and the HDMI receiving unit 303 include the following transmission channels. That is, there are three TMDS channels #0 to #2 as transmission channels for serially transmitting pixel data and audio data in one direction in synchronization with a pixel clock from the HDMI transmission unit 206 to the HDMI receiving unit 303. Furthermore, there is a TMDS clock channel as a transmission channel for transmitting a pixel clock.

The HDMI transmission unit 206 includes an HDMI transmitter 81. For example, the transmitter 81 converts non-compressed pixel data of an image into corresponding differential signals, and serially transmits the differential signals to the HDMI receiving unit 303 in one direction through the HDMI cable 400 using three TMDS channels #0, #1, and #2, which are a plurality of channels.

Furthermore, the transmitter 81 converts the audio data accompanying the non-compressed image, necessary control data, other auxiliary data, and the like into corresponding differential signals, and serially transmits the differential signals in one direction to the HDMI receiving unit 303 using three TMDS channels #0, #1, and #2.

In addition, the transmitter 81 transmits a pixel clock synchronized with the pixel data that is transmitted using three TMDS channels #0, #1, and #2 by using the TMDS clock channel through the HDMI cable 400. Here, in one TMDS channel #i (i=0, 1, 2), 10-bit pixel data is transmitted during one clock of the pixel clock.

In the active video section, the HDMI receiving unit 303 receives the differential signal corresponding to the pixel data, which is transmitted in one direction from the HDMI transmission unit 206 by using a plurality of channels. Furthermore, in the horizontal blanking period or in the vertical blanking period, the HDMI receiving unit 303 receives the differential signals corresponding to the audio data and the control data, which are transmitted in one direction from the HDMI transmission unit 206 by using a plurality of channels.

That is, the HDMI receiving unit 303 includes an HDMI receiver 82. The HDMI receiver 82 receives the differential signals corresponding to the pixel data, and the differential signals corresponding to the audio data and the control data, which are transmitted in one direction from the HDMI transmission unit 206 by using the TMDS channels #0, #1, and #2. In this case, the differential signals are is received in synchronization with the pixel clock transmitted from the HDMI transmission unit 206 through the TMDS clock channel.

Examples of the HDMI system include, in addition to the TMDS channels #0 to #2 and the TMDS clock channel described above, transmission channels called a DDC (Display Data Channel) 83 and a CEC line 84. The DDC 83 is formed from two signal lines (not shown) contained in the HDMI cable 400. The DDC 83 is used for the HDMI transmission unit 206 to read E-EDID (Enhanced Extended Display Identification Data) from the HDMI receiving unit 303.

The HDMI receiving unit 303 includes, in addition to the HDMI receiver 81, an EDID ROM (Read Only Memory) 85 in which E-EDID that is performance information regarding the performance (configuration/capability) of the HDMI receiving unit 303 is stored. The HDMI transmission unit 206, in response to, for example, the request of the CPU 211 (see FIG. 2), reads E-EDID through the DDC 83 from the HDMI receiving unit 303 connected through the HDMI cable 400.

The HDMI transmission unit 206 sends the read E-EDID to the CPU 211. The CPU 211 stores this E-EDID in the flash ROM 212 or the DRAM 213. As described above, the E-EDID contains the format information regarding the stereoscopic image data, which can be handled by the television receiver 300, and information (request information) indicating whether or not the television receiver 300 has requested that transmission of the stereoscopic image data be performed without performing format conversion.

The CEC line 84 is formed from one signal line (not shown) contained in the HDMI cable 400, and is used to perform both-way communication of data for control between the HDMI transmission unit 206 and the HDMI receiving unit 303. This CEC line 84 forms a control data line.

Furthermore, the HDMI cable 400 includes a line (HPD line) 86 connected to a pin called an HPD (Hot Plug Detect). The source device can use the relevant line 86 so as to detect the connection of a sink device. Meanwhile, this HPD line 86 can also be used as a HEAC-line forming a both-way communication path. Furthermore, the HDMI cable 400 includes a line (power-supply line) 87 that is used to supply power from the source device to the sink device. In addition, the HDMI cable 400 includes a utility line 88. This utility line 88 is also used as a HEAC+ line forming a both-way communication path.

[E-EDID Structure]

In the manner described above, in response to the request of the CPU 211 (see FIG. 2), the HDMI transmission unit 206, for example, reads E-EDID through the DDC 83 from the HDMI receiving unit 303 connected through the HDMI cable 400. Then, on the basis of the E-EDID, the CPU 211 obtains the format information of the stereoscopic image data, which can be handled by the television receiver 300 and information (request information) indicating whether or not it has been requested that transmission of the stereoscopic image data be performed without performing format conversion.

Figure 7:
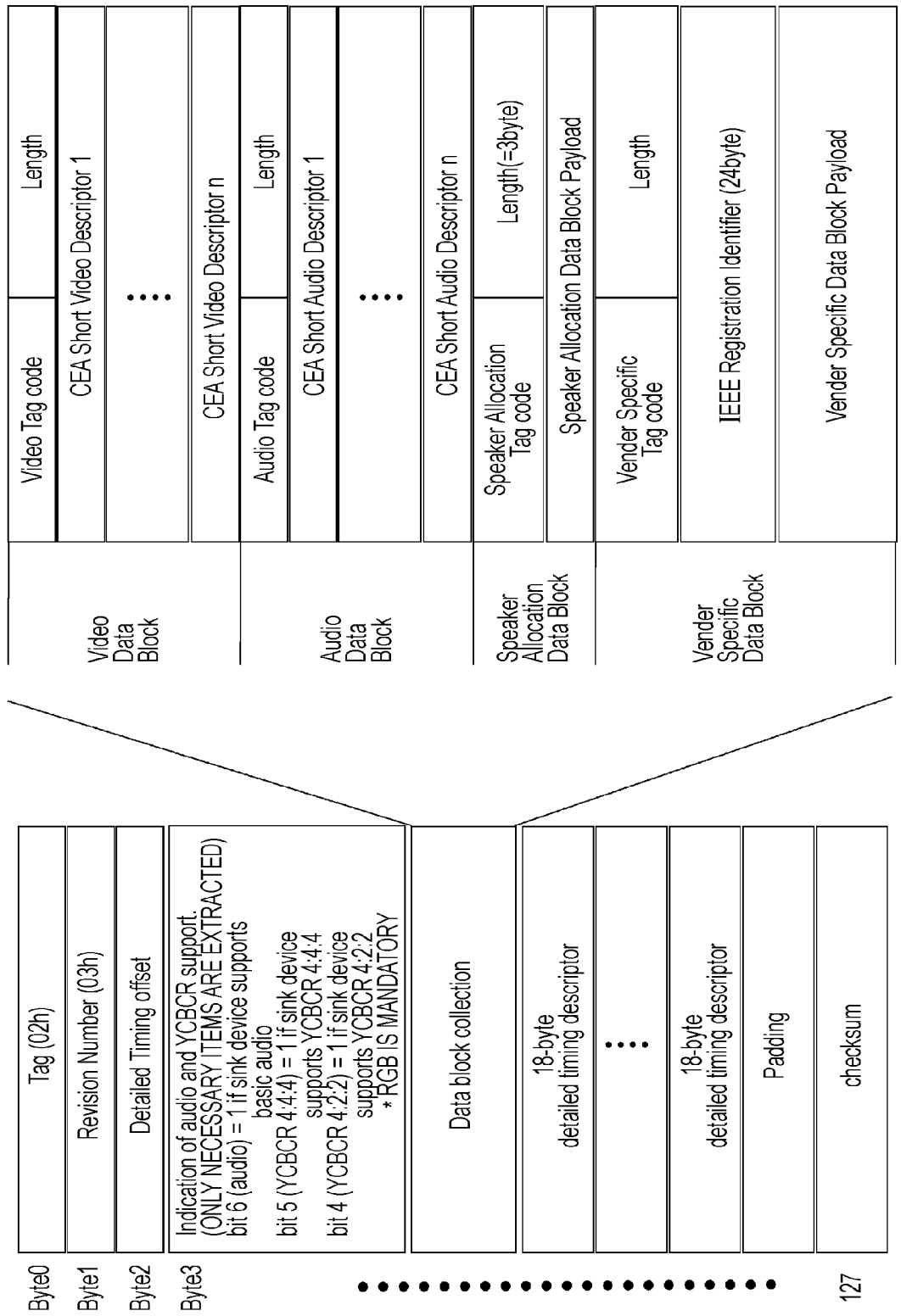
FIG. 7 illustrates the structure (Block 1 and thereafter, expansion portions for HDMI) of E-EDID contained in the television receiver.

FIG. 7 illustrates an EDID structure (Block 1 and thereafter, expansion portions for HDMI). This EDID structure, though its details are omitted, is defined in the EIA/CEA-861B standard.

In each "CEA Short Video Descriptor" of "Video Data Block", video formats that can be displayed by the television receiver (sink device) 300 are defined. FIG. 8 illustrates the details of "CEA Short Video Descriptor". Displayable "Video Data" is specified in 7-bit "VIC: Video Identification Code". FIG. 9 illustrates the correspondence (partially extracted) between "Video Format" and "Video Identification Code (Video ID Code). For example, in the format of 1280×720P, "Video Identification Code=4".

Furthermore, FIG. 10 illustrates an example of the structure of an HDMI Vendor Specific Data Block (VSDB). In the zeroth block, the header indicating the data area of data "Vender Specific" indicated by "Vendor-Specific tag code (=3)" is placed. Furthermore, in this zeroth block, the information indicating the length of the data "Vender Specific" represented by "Length (=N)" is placed. Furthermore, in the first block to the third block, the information indicating number "0x000003" registered for HDMI (R) represented by "24-bit IEEE Registration Identifier (0x000003) LSB first" is placed.

Furthermore, in the seventh bit of the thirteenth block, a flag indicating whether or not stereoscopic image data (3D image data) represented by "3D_present" can be handled is placed. Furthermore, in the fourth bit to the zeroth bit of the fourteenth block, the size information of the blocks, which indicates a 3D data structure that can be handled in addition to a mandatory 3D data structure, which is placed in the fifteenth block and thereafter, which is represented by "HDMI_3D_LEN", is placed.

In a case where there is a 3D data structure (stereoscopic image data format) that can be handled in addition to a mandatory 3D data structure, E-EDID is registered in the following manner. First, "Video Identification Code" of this 3D data structure is registered in the n-th "CEA Short Video Descriptor". Furthermore, the number of the "CEA Short Video Descriptor", in which "Video Identification Code" is registered as described above, is registered in the L-th "2D_VIC_order_L" of HDMI VSDB. In addition, "3D_structure" of this 3D data structure is registered in the L-th "3D_structure_L".

Specifically, in a case where handling of a 3D data structure (stereoscopic image data format) of 1280×720P T&B is possible in addition to the mandatory 3D data structure, the following registrations are performed in the E-EDID. First, since "1280×720P" is "Video Identification Code=4" (see FIG. 9), "4" is registered in the zeroth "CEA Short Video Descriptor 1". Then, "0000", which is the number of this "CEA Short Video Descriptor 1", is described in "2D_VIC_order_1" of HDMI VSDB. Furthermore, "3D_structure" of "T&B" is, for example, "0110", as shown in FIG. 11. As a consequence, "0110 is registered in 3D_structure_1".

Furthermore, in a predetermined reserved bit, for example, the zeroth bit of the thirteenth block in this example, a 1-bit flag represented by "3D_not_conv" is newly defined and arranged. This flag is information (request information) for requesting the set top box 200 to transmit the received image data without performing format conversion. When "3D_not_conv=0", this indicates that no request is made, and when "3D_not_conv=1", a request is made.

Meanwhile, in the example of the structure of HDMI Vendor Specific Data Block (VSDB) shown in FIG. 10, a 1-bit flag "3D_not_conv" is placed in the zeroth bit of the thirteenth block. However, it is not necessarily necessary to be placed in this manner. the flag may be placed in any one of the sixth bit to the first bit of the thirteenth block, and furthermore, in a reserved bit position of another block.

As described above, in the stereoscopic image display system 10 shown in FIG. 1, in the set top box 200, as a result of a predetermined condition being satisfied, received stereoscopic image data from a broadcast station is transmitted to the television receiver 300 in the as-is format without performing format conversion. Here, the predetermined conditions are that the format of the received stereoscopic image data is a format that can be handled by the television receiver 300, and that the television receiver 300 has requested that transmission of the stereoscopic image data be performed in the as-is format. As a consequence, in the set top box 200, the received stereoscopic image data can be transmitted to the television receiver 300 without performing unnecessary format conversion, and image quality deterioration due to format conversion can be prevented.

Furthermore, in the stereoscopic image display system 10 shown in FIG. 1, in the set top box 200, the information for a format conversion process is obtained by reading an EDID ROM 85 provided in the television receiver 300. This information is the format information regarding the stereoscopic image data that can be handled by the television receiver 300 and information about whether or not the television receiver 300 has requested that the transmission of the stereoscopic image data be performed without performing format conversion. As a consequence, it is possible to eliminate the time and effort for inputting information by the user, and the ease of use for the user can be improved.

Furthermore, in the stereoscopic image display system 10 shown in FIG. 1, in the set top box 200, for example, when the above-mentioned predetermined conditions are satisfied and furthermore permission of the user is obtained, the received image data is transmitted to the television receiver 300 without performing format conversion. In this case, even if the format of the received stereoscopic image data is a format that can be handled by the television receiver 300, since the user does not give his/her permission, for example, the received stereoscopic image data is converted into a predetermined format and is transmitted.

Furthermore, in the stereoscopic image display system 10 shown in FIG. 1, in the set top box 200, when the above-mentioned predetermined conditions are not satisfied, the received stereoscopic image data is converted into a preset format and is transmitted to the television receiver 300. In this case, since the received stereoscopic image data is converted into a preset format and is transmitted, handling in the television receiver 300 becomes possible.

2. Modification

Meanwhile, in the above-described embodiment, the set top box 200 is configured to transmit, under the following conditions, the received stereoscopic image data to the television receiver 300 in the as-is format without performing format conversion. These conditions are that the format of the received stereoscopic image data is a format that can be handled by the television receiver 300 and that the television receiver 300 has requested that the transmission thereof is performed in the as-is format.

However, when the format of the received stereoscopic image data is a format that can be handled by the television receiver 300, it is also considered that the received stereoscopic image data is transmitted to the television receiver 300 in the as-is format without performing format conversion. In this case, it is not necessary for the television receiver 300 to place information about whether or not it has been requested that transmission of the stereoscopic image data be performed without performing format conversion in HDMI VSDB.

Furthermore, in the embodiment, the set top box 200 is configured to receive stereoscopic image data from a broadcast signal from the broadcast station 100. However, it is also considered that the set top box 200 receives stereoscopic image data from a streaming server through a network.

Furthermore, in the above-described embodiment, the set top box 200 is configured to convert, under the following conditions, received stereoscopic image data into a preset format and transmit it to the television receiver 300. This condition is that the format of the received stereoscopic image data is not a format that can be handled by the television receiver 300 or that the television receiver 300 has not requested that the transmission thereof is performed without performing format conversion. However, at this time, the set top box 200 is considered to be configured to convert received stereoscopic image data into a mandatory format and transmit it to the television receiver 300.

Furthermore, in the above-described embodiment, the set top box 200 is configured to directly transmit stereoscopic image data received by the digital tuner 204 to the television receiver 300. However, the set top box 200 may also be configured to prestore the stereoscopic image data received by the digital tuner 204 in a storage (not shown), read stereoscopic image data from the storage, and transmit the stereoscopic image data to the television receiver 300 at an predetermined timing. The predetermined timing is, for example, a timing of a reproduction operation by the user.

Furthermore, in the above-described embodiment, the set top box 200 is configured to transmit received stereoscopic image data to the television receiver 300. However, in place of the television receiver 300, a configuration of transmitting received stereoscopic image data to a monitor device, a projector, or the like, is considered. Furthermore, in place of the set top box 200, a configuration, such as a recorder with a receiving function or a personal computer, is considered.

Furthermore, in the above-described embodiment, the set top box 200 and the television receiver 300 are connected to each other through the HDMI cable 400. However, of course, this invention can also be applied the same to a case where these are connected wirelessly.

INDUSTRIAL APPLICABILITY

This invention can be applied to a set top box or the like, which receives stereoscopic image data and transmits this stereoscopic image data to a television receiver by means of a digital interface, such as HDMI.

REFERENCE SIGNS LIST

10 . . . stereoscopic image display system
85 . . . EDID ROM
100 . . . broadcast station
200 . . . set top box
201 . . . bit stream processing unit
202 . . . HDMI terminal
203 . . . antenna terminal
204 . . . digital tuner
205 . . . video signal processing circuit
206 . . . HDMI transmission unit
207 . . . audio signal processing circuit
211 . . . CPU
212 . . . flash ROM
213 . . . DRAM
214 . . . internal bus
215 . . . remote control receiving unit
216 . . . remote control transmitter
300 . . . television receiver
301 . . . 3D signal processing unit
302 . . . HDMI terminal
303 . . . HDMI receiving unit
304 . . . antenna terminal
305 . . . digital tuner
306 . . . bit stream processing unit
307 . . . video/graphic processing circuit
308 . . . panel driving circuit
309 . . . display panel
310 . . . audio signal processing circuit
311 . . . audio amplification circuit
312 . . . speaker
321 . . . CPU
322 . . . flash ROM
323 . . . DRAM
324 . . . internal bus
325 . . . remote control receiving unit
326 . . . remote control transmitter
400 . . . HDMI cable

The invention claimed is:

1. An image data transmission apparatus which conforms to an HDMI (High Definition Multimedia Interface) standard, said apparatus comprising:
   an image data receiving device to receive stereoscopic image data for displaying a stereoscopic image; and
   an HDMI image data transmission device to transmit the stereoscopic image data received in one direction through one or more channels by the image data receiving device to an external HDMI device through a first HDMI transmission path by using a differential signal corresponding to at least audio data, control data accompanying an image and other auxiliary data,
   in which the image data transmission device is operable to read, via a second HDMI data path separate to the first HDMI transmission path, E-EDID (Enhanced Extended Display Identification Data) information having an EDID structure which are stored in a storage unit provided in the external HDMI device, the E-EDID information including format data indicating stereoscopic image data which can be handled by the external device and request information indicating the external HDMI device has requested a predetermined stereoscopic function, in which the predetermined stereoscopic function is to transmit the received stereoscopic image data in an as-is format without performing a format conversion on the received stereoscopic image data, in which the image data transmission device is operable to transmit, when a format of the stereoscopic image data received by the image data receiving device is a format that can be handled by the external HDMI device, and the external HDMI device has requested that transmission of the stereoscopic image data be performed with the predetermined stereoscopic function, the stereoscopic image data received by the image data receiving device to the external HDMI device without performing the format conversion, in which the request information is arranged within a thirteenth block of a VSDB (Vendor Specific Data Block) of the EDID structure.

2. An image data transmission method for use with an image data transmission apparatus which conforms to an HDMI (High Definition Multimedia Interface) standard, said method comprising:

an image data receiving step of receiving stereoscopic image data for displaying a stereoscopic image; and an image data transmission step of transmitting the stereoscopic image data received in one direction through one or more channels in the image data receiving step to an external HDMI device through a first HDMI transmission path by using a differential signal corresponding to at least audio data, control data accompanying an image and other auxiliary data, in which E-EDID (Enhanced Extended Display Identification Data) information having an EDID structure stored in a storage unit provided in the external device is read, via a second HDMI data path separate to the first HDMI transmission path, the E-EDID information including format data indicating stereoscopic image data which can be handled by the external HDMI device and request information indicating the external HDMI device has requested a predetermined stereoscopic function, in which the predetermined stereoscopic function is to transmit the received stereoscopic image data in an as-is format without performing a format conversion on the received stereoscopic image data, wherein, in the image data transmission step, when a format of the stereoscopic image data received in the image data receiving step is a format that can be handled by the external HDMI device, and the external HDMI device has requested that transmission of the stereoscopic image data be performed with the predetermined stereoscopic function, the stereoscopic image data received in the image data receiving step is transmitted to the external HDMI device without performing the format conversion, in which the request information is arranged within a thirteenth block of a VSDB (Vendor Specific Data Block) of the EDID structure.

3. An image data receiving apparatus which conforms to an HDMI (High Definition Multimedia Interface) standard, said apparatus comprising:

an HDMI image data receiving device to receive stereoscopic image data for displaying a stereoscopic image through a first HDMI transmission path in one direction through one or more channels by using a differential signal corresponding to at least audio data, control data accompanying an image and other auxiliary data from an external HDMI device; and a storage device to store E-EDID (Enhanced Extended Display Identification Data) information having an EDID structure which includes at least format information regarding stereoscopic image data that can be handled and information about a predetermined stereoscopic function, these two types of information being capable of being read by the external HDMI device through a second HDMI transmission path separate to the first HDMI transmission path, in which the predetermined stereoscopic function is to transmit the received stereoscopic image data in an as-is format without performing a format conversion on the received stereoscopic image data, and in which the information about the predetermined stereoscopic function is arranged within a thirteenth block of a VSDB (Vendor Specific Data Block) of the EDID structure.

4. An image data transmission apparatus which conforms to an HDMI (High Definition Multimedia Interface) standard, said apparatus comprising:

image data receiving means for receiving stereoscopic image data for displaying a stereoscopic image; and image data transmission means for transmitting the stereoscopic image data received in one direction through one or more channels by the image data receiving means to an external HDMI device through a first HDMI transmission path by using a differential signal corresponding to at least audio data, control data accompanying an image and other auxiliary data, in which the image data transmission means is operable to read, via a second HDMI data path separate to the first HDMI transmission path, E-EDID (Enhanced Extended Display Identification Data) information having an EDID structure stored in a storage unit provided in the external HDMI device, the E-EDID information including format data indicating stereoscopic image data which can be handled by the external HDMI device and request information indicating the external HDMI device has requested a predetermined stereoscopic function, in which the predetermined stereoscopic function is to transmit the received stereoscopic image data in an as-is format without performing a format conversion on the received stereoscopic image data, in which the image data transmission means is operable to transmit, when a format of the stereoscopic image data received by the image data receiving means is a format that can be handled by the external HDMI device, and the external device has requested that transmission of the stereoscopic image data be performed with the predetermined stereoscopic function, the stereoscopic image data received by the image data receiving means to the external HDMI device without performing the format conversion, and in which the request information is arranged within a thirteenth block of a VSDB (Vendor Specific Data Block) of the EDID structure.

5. An image data receiving apparatus which conforms to an HDMI (High Definition Multimedia Interface) standard, said apparatus comprising:

image data receiving means for receiving stereoscopic image data for displaying a stereoscopic image through a first HDMI transmission path in one direction through one or more channels by using a differential signal corresponding to at least audio data, control data accompanying an image and other auxiliary data from an external HDMI device; and storage means for storing E-EDID (Enhanced Extended Display Identification Data) information having an EDID structure which includes at least format information regarding stereoscopic image data that can be handled and information about a predetermined stereoscopic function, these two types of information being capable of being read by the external HDMI device through a second HDMI transmission path separate to the first HDMI transmission path, in which the predetermined stereoscopic function is to transmit the received stereoscopic image data in an as-is format without performing a format conversion on the received stereoscopic image data, and in which the information about the predetermined stereoscopic function is arranged within a thirteenth block of a VSDB (Vendor Specific Data Block) of the EDID structure.

6. A stereoscopic image data apparatus, which conforms to an HDMI (High Definition Multimedia Interface) standard, for use with an external HDMI display device, said stereoscopic image data apparatus comprising:

an image data receiving device to receive stereoscopic image data having a stereoscopic transmission format;

a processing device to read E-EDID (Enhanced Extended Display Identification Data) information having an EDID structure from the external HDMI display device and to determine therefrom (i) whether a request to provide the received stereoscopic image data in an as-is format without performing a format conversion has been received from the external display device and (ii) whether the external display device is capable of displaying the stereoscopic image data in the stereoscopic transmission format; and an HDMI transmission device to transmit the stereoscopic image data in the stereoscopic transmission format without performing format conversion for reception by the external display device through a first HDMI transmission path having a number of TMDS channels when the processing device determines (i) that the request has been received and (ii) that the external display device is capable of displaying the stereoscopic image data in the stereoscopic transmission format, in which information about the request is arranged within a thirteenth block of a VSDB (Vendor Specific Data Block) of the EDID structure.

7. The stereoscopic image data apparatus according to claim 6, in which the request from the external HDMI display device is provided by way of a second HDMI transmission path which is different from the first HDMI transmission path.

8. The stereoscopic image data apparatus according to claim 6, in which the external HDMI display device is a television receiver.

9. The stereoscopic image data apparatus according to claim 6, in which the stereoscopic transmission format is a Top & Bottom stereoscopic type format or a Side by Side stereoscopic type format.

* * * * *